United States Patent [19]
Mai et al.

[11] 3,905,918
[45] Sept. 16, 1975

[54] CATALYST FOR PURIFYING EXHAUST GASES

[75] Inventors: Gerhard Mai, Bruchkobel; Reiner Siepmann, Rodenbach, both of Germany

[73] Assignee: W. C. Heraeus GmbH, Hanau am Main, Germany

[22] Filed: Mar. 28, 1974

[21] Appl. No.: 455,766

Related U.S. Application Data

[63] Continuation-in-part of Ser. No. 330,137, Feb. 6, 1973, abandoned.

[30] Foreign Application Priority Data
Sept. 16, 1972 Germany............................ 2245607
June 18, 1973 Japan................................ 48-67880

[52] U.S. Cl. ................ 252/462; 252/464; 252/465; 252/466 B; 252/466 PT; 252/469; 252/470; 252/471
[51] Int. Cl.² .......................................... B01J 23/10
[58] Field of Search...... 252/462, 464, 465, 466 PT, 252/466 B, 469, 470, 471, 472, 473, 475; 423/213.2, 213.5

[56] References Cited
UNITED STATES PATENTS
3,331,787  7/1967  Keith et al. ................. 252/477 R
3,644,147  2/1972  Young ......................... 136/86 D
3,780,126  12/1973  Manning ..................... 252/471 X FOREIGN PATENTS OR APPLICATIONS
2,119,702  11/1971  Germany .................... 423/213.5

*Primary Examiner*—W. J. Shine
*Attorney, Agent, or Firm*—Burgess, Dinklage & Sprung

[57] ABSTRACT

A catalyst for purifying exhaust gases from internal combustion engines has at least on its surface the following components:

a. a composition having the formula $$(A_1)_m(A_2)_n(B_1)_p(B_2)_qO_3$$

wherein $m$ and $n$, respectively, have values of 0 to 1, and $p$ and $q$, respectively, have values greater than 0 but less than 1, and $m + n = 1$ and $p + q = 1$; and $A_1$ is at least one trivalent cation of metals selected from the group of the rare earth metals;

$A_2$ is at least one divalent cation of metals selected from the group of Sr, Ba and Pb;

$B_1$ is at least one divalent cation of metals selected from the group of Ni, Co, Fe, Zn, Cu, and Mn;

$B_2$ is at least one selected from the group of at least one tetravalent cation of metals from the group of Ru, Os, Ir, Pt, Ti, Mo, W, Nb, Mn and V, and at least one pentavalent cation of metals from the group of Ta, Sb and Nb;

with the proviso that $(m \cdot a_1) + (n \cdot a_2) + (p \cdot b_1) + (q \cdot b_2)$ equals 6 such that a neutrality of charge exists, wherein $a_1$ equals the valency of $A_1$, $a_2$ equals the valency of $A_2$, $b_1$ equals the valency of $B_1$ and $b_2$ equals the valency of $B_2$; and b. at least one element in metallic form from the group of ruthenium, rhodium, palladium, iridium and platinum.

11 Claims, 5 Drawing Figures

CATALYST FOR PURIFYING EXHAUST GASES

RELATED APPLICATIONS

This application is a continuation-in-part of copending application Ser. No. 330,137 filed Feb. 6, 1973 now abandoned, and is related to copending applications Ser. Nos. 395,089 and 395,090 both filed Sept. 7, 1973.

BACKGROUND

The invention relates to a catalyst for the purification of exhaust gases containing nitrogen oxides and/or carbon monoxide and/or hydrocarbons.

Numerous catalysts and catalytic processes are known both for the reduction of the nitrogen oxides and for the oxidation of carbon monoxide and hydrocarbons.

A composition of the general formula:

$$(A_1)_m(A_2)_n(B_1)_p(B_2)_qO_3,$$

wherein $m$ and $n$, respectively, have values of 0 to 1, and $p$ and $q$, respectively, have values greater than 0 but less than 1, and $m + n = 1$ and $p + q = 1$; and $A_1$ is at least one trivalent cation of metals selected from the group of the rare earth metals;

$A_2$ is at least one divalent cation of metals selected from the group of Sr, Ba and Pb;

$B_1$ is at least one divalent cation of metals selected from the group of Ni, Co, Fe, Zn, Cu, and Mn;

$B_2$ is at least one selected from the group of at least one tetravalent cation of metals from the group of Ru, Os, Ir, Pt, Ti, Mo, Nb, Mn and V, and at least one pentavalent cation of metals from the group of Ta, Sb and Nb;

with the proviso that $(m \cdot a_1) + (n \cdot a_2) + (p \cdot b_1) + (q \cdot b_2)$ equals 6 such that a neutrality of charge exists, wherein $a_1$ equals the valency of $A_1$, $a_2$ equals the valency of $A_2$, $b_1$ equals the valency of $B_1$ and $b_2$ equals the valency of $B_2$, has been proposed as a catalytically active composition that can be used equally for reduction and oxidation.

This catalyst, which is particularly suitable for the purification of exhaust gases of internal combustion engines has very good properties. Complete oxidation of the oxidizable pollutants contained in the exhaust gas takes place beginning at about 400°C.

Such a temperature, however, is not always present in industrial exhaust gases; the exhaust gases of internal combustion engines achieve it under running conditions.

SUMMARY

The invention is aimed at the problem of creating a catalyst which at temperatures below approximately 400°C makes possible the complete elimination of the pollutants and which has a higher oxidation and reduction activity than the proposed composition.

This problem is solved in accordance with the invention by the combination of the following features:

a. The catalyst contains at least on its surface a composition of the general formula $(A_1)_m(A_2)_n(B_1)_p(B_2)_qO_3$, wherein $m$ and $n$, respectively, have values of 0 to 1, and $p$ and $q$ respectively, have values greater than 0 but less than 1, and $m + n = 1$ and $p + q = 1$; and $A_1$ is at least one trivalent cation of metals selected from the group of the rare earth metals;

$A_2$ is at least one divalent cation of metals selected from the group of Sr, Ba and Pb;

$B_1$ is at least one divalent cation of metals selected from the group of Ni, Co, Fe, Zn, Cu, and Mn;

$B_2$ is at least one selected from the group of at least one tetravalent cation of metals from the group of Ru, Os, Ir, Pt, Ti, Mo, W, Nb, Mn and V, and at least one pentavalent cation of metals from the group of Ta, Sb and Nb;

with the proviso that $(m \cdot a_1) + (n \cdot a_2) + (p \cdot b_1) + (q \cdot b_2)$ equals 6 such that a neutrality of charge exists, wherein $a_1$ equals the valency of $A_1$, $a_2$ equals the valency of $A_2$, $b_1$ equals the valency of $B_1$ and $b_2$ equals the valency of $B_2$.

b. It contains additionally at least on its surface, in metallic form, at least one element from the group: ruthenium, rhodium, palladium, iridium, platinum.

DESCRIPTION

Platinum or a mixture of platinum and palladium are especially suitable as elements in metallic form from the group of ruthenium, rhodium, palladium, iridium and platinum, an atomic ratio of platinum to palladium of the order of from 1:4 to 4:1, preferably 1:1, having proven desirable.

The catalysts of the invention may be used as solid catalysts (bodies consisting of catalyst, uniformly mixed with ceramic binding agent if desired), or they may be used in conjunction with a support material, preferably a glass-ceramic or ceramic material. The metallic component can cover a portion of the surface of the support or a portion of the surface of component (a) alone or on a support as described in the summary above.

According to an additional feature of the invention, it is advantageous to use a support material consisting wholly or partially of cobalt aluminum spinel.

The shape of the support material may be as desired. Preferably, however, the support material is in honeycomb-tube or pellet form.

Through the use of the catalysts of the invention, exhaust gases can be oxidized catalytically at a lower temperature than hitherto, without additional heating beforehand, which in some cases is difficult and entails additional expense. Their use in the purification of exhaust gases of internal combustion engines makes it possible to eliminate the oxidicable pollutants even in the cold starting phase, thereby permitting exhaust gas purification over the entire range of operation without additional heating apparatus.

In addition, it is possible to perform the purification of exhaust gases containing nitrogen oxides, carbon monoxide and hydrocarbons by using the catalysts of the invention, both in the two-bed process and in the technically advantageous single-bed process.

In the two-bed process, the reduction of the nitrogen oxides and the oxidation of carbon monoxide and hydrocarbons are performed each in one of the two catalyst beds which are connected in tandem. The engine in this case is operated hypostoichiometrically, that is, with less than a stoichiometric amount of air; secondary air is fed in ahead of the oxidation catalyst bed.

In the single-bed process the motor is operated stoichiometrically, that is, at an air-to-fuel ratio of approximately 1; the harmful reducible and oxidizable components contained in the combustion product are reacted with one another on the catalyst contained in the single catalyst bed.

The heat resistance and life of the catalysts of the invention are excellent.

Suitable supports for the catalyst of the invention can be refractory or ceramic structures having cellular channels therethrough which provide a large internal surface area. Particularly suitable supports are corregared (Honeycomb or split cell) ceramic structures made from alpha alumina or cordierite and are sold under the trademark THERMACOMB. These structures can be used in stacked or rolled configurations and one such commercially available corregared alpha alumina support has the following properties:

| Water absorption | 17% |
|---|---|
| Specific gravity | 2.5 |
| Compressive strength (parallel to passages) | 8500 psi |
| Specific heat | 0.21 BTU/lb.°F |
| Thermal Conductivity at 570°F | 85 in./hr BTU ft/°F. |

A number of examples are given below for the production of the catalysts of the invention, along with the results of experiments showing their catalytic activity in the reduction of nitrogen oxides and in the oxidation of carbon monoside and hydrocarbons.

In the following examples a stacked honeycomb structure of cordierite was used as the catalyst body. This material is sold under the name THERMACOMB ALSIMAG 795 by American Lava Corporation and has the following dimensions and properties.

| Compressive strength (parallel to passages) | 2,750 psi |
|---|---|
| Thermal Conductivity at 570°F BTU in./hr. ft.² °F | 10 |
| Specific Heat, BTU/lb. °F | 0.19 |
| Water absorption | 25–30% |
| Surface Area, in.²/in.³ | 56 |
| Open Area | 69% |
| Bulk density, lb./ft³ | 33 |

Very good results have been achieved with a catalyst containing elemental platinum and the composition: $LaCo_{1/6}Fe_{1/6}Ni_{1/6}Ru_{1/2}O_3$ which is prepared according to Example 1 herein. On the basis of X-ray examination, the composition has a perovskite structure.

In many oxides of the formula $ABO_3$, wherein A signifies metal ions and B metal ions different from A, the perovskite structure occurs (cf. U.S. Pat. No. 3,595,809). The cations A and B are of different size. One of the cations is much smaller than the others. The cation A does not have to be a cation of only one metal but can be composed of cations of various metals ($A_1 + A_2 + A_3 + \ldots + A_n$), whereby all of these cations must have approximately the same ion radius. The same applies to the B cation. For example, an oxide with perovskite structure can have the formula:

$(A_1 + A_2)(B_1 + B_2 + B_3)O_3$. The charges of the cations can vary but the total charge must amount to + 6.

In tests of catalytic activity there was observed a relationship between the structural characteristics of these "mixed oxides" and their catalytic activity. Especially catalytically active are "mixed oxides" having a perovskite structure.

Generally these "mixed oxides" are prepared by reacting suitable starting compounds in stoichiometric amounts necessary to form the empirical formula $(A_1)_m(A_2)_n(B_1)_p(B_2)_qO_3$ Thus, aqueous solutions, containing the cations $A_1$, $A_2$, $B_1$ and $B_2$ in the form of their nitrates, were evaporated to dryness and the obtained residue was heated to incandescence at 700°C for four hours.

From a number of "mixed oxides" produced, x-ray powder diagrams were made for determining their structure. The obtained diagrams clearly show the reflexes of a perovskite phase. It was not possible to detect oxides of the individual elements roentgenographically. It was concluded from this that the cations present in the starting compunds used had reacted with one another by forming a composition with perovskite structure which could therefore be assigned an empirical formula, for example $LaCo_{1/6}Fe_{1/6}Ni_{1/6}Ru_{1/2}O_3$.

Catalysts prepared in the examples were tested roentgenographically. Taking the numerous self-interferences of the cordierite used in the example herein into consideration, it was possible to identify the strongest reflexes of the perovskite phase which do not coincide with the reflexes of the carrier material. Band separations $d$ [A] for components of catalysts of the invention are as follows:

| Catalytically active composition: | Band Separations d [A]: | | | |
|---|---|---|---|---|
| $LaFe_{1/6}Co_{1/6}Ni_{1/6}Ru_{1/2}O_3$ | 2.79 | 2.28 | 1.96₉ | 1.60₈ |
| $LaFe_{1/6}Ni_{1/6}Co_{1/6}Ru_{1/6}Ti_{1/3}O_3$ | 2.78 | 2.27 | 1.96₅ | 1.60₃ |
| $LaNi_{1/2}Mo_{1/2}O_3$ | 2.77 | | 1.96₁ | 1.59₈ |

EXAMPLE 1

The honeycomb support (vol. 1.33 l) is impregnated with a suspension of 100 g boehmite ($Al_2O_3 \cdot H_2O$) in 1 liter of water at room temperature. After blowing out with compressed air, the honeycomb body is dried at 250°C. The impregnation, blowing out and drying is repeated, followed by a 2-hour heat treatment at 550°C which converts the inactive boehmite to active alumina. A honeycomb support is obtained having a coating of aluminum oxide with a large surface. The weight of the coating amounts to 6 percent of the weight of the uncoated honeycomb support. The coated honeycomb support is impregnated with 200 ml of an aqueous solution of 1.93 g ruthenium as nitrate, 16.5 g La (NO₃)₃

. 6 H$_2$O, 1.85 g Ni(NO$_3$)$_2$ . 4 H$_2$O, 1.85 g Co(NO$_3$)$_2$ . 6 H$_2$O, 2.65 g Fe(NO$_3$)$_3$ . 9 H$_2$O and 1.61 g of oxalic acid. After drying at 240°C, the impregnated honeycomb body is subjected to four hours of heat treatment at 550°C. The composition applied to this support corresponds to the formula: LaCo$_{1/6}$Fe$_{1/6}$Ni$_{1/6}$Ru$_{1/2}$O$_3$; the ruthenium content amounts to 1.45 g/l.

The coated honeycomb body is impregnated with an aqueous solution containing 2.33 g H$_2$PtCl$_6$, dried at 240°C and reduced in a stream of H$_2$/N$_2$ (10% H$_2$, 90% N$_2$). The catalyst thus prepared contains 0.7 g/l of metallic Pt. The effectiveness of the catalyst is tested using a mixture of carbon monoxide and air containing 1% CO, and also using a test gas corresponding to the exhaust of an Otto cycle engine with regard to its content of NO, CO, H$_2$, H$_2$O, O$_2$ and N$_2$.

Figure 1:
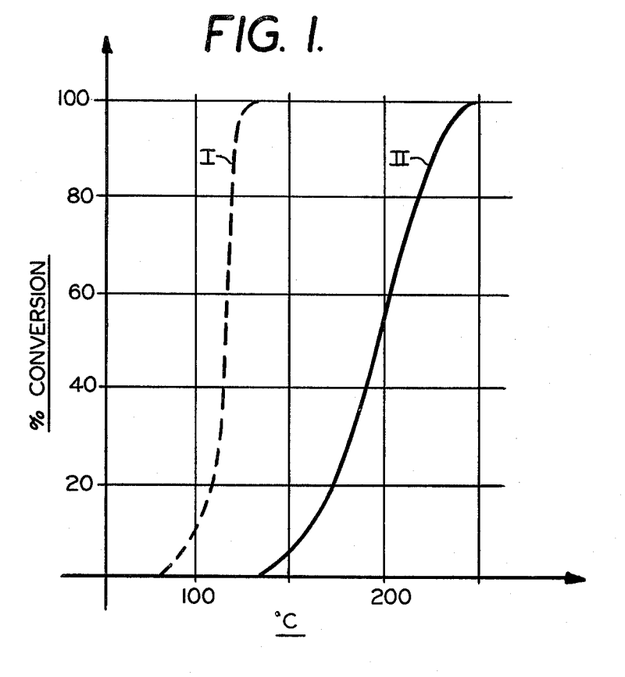
FIGS. 1–4 are graphs showing the conversion of carbon monoxide to carbon dioxide using the catalyst of the invention.

Curve I (broken line) in FIG. 1 shows the conversion of the CO to CO$_2$ when the CO-air misture is passed over the catalyst, in relation to the temperature. The oxidation of CO begins at about 105°C and becomes virtually complete at about 120°C.

Curve II (solid line) of the same figure shows the transformation of the nitrogen oxide to N$_2$ when the test gas is passed over the catalyst. Nitrogen oxide reduction begins at about 160°C and becomes complete at about 230°C.

In a second preparation, a coated honeycomb body, prepared as described in this example, is impregnated with 200 ml of an aqueous solution containing 0.586 g Pt as H$_2$PtCl$_6$ and 0.38 g Pd as PdCl$_2$, dried at 240°C and reduced in a stream of H$_2$/N$_2$ (10% H$_2$, 90% N$_2$) to give a finished catalyst containing metallic Pt and metallic Pd in an atomic ratio of 1 to 1 and exhibiting oxidation and reduction activity.

EXAMPLE 2

1 liter of an aqueous suspension, which contains 80 g boehmite and 80 g Al(NO$_3$)$_3$.9H$_2$O, is kept for one hour at boiling point. After cooling the honeycomb support (vol. 1.33 l) is impregnated with this suspension. The honeycomb support is, after blowing out with compressed air, dried at 250°C. Then it is again impregnated, blown out and dried, followed by a 2-hour heat treatment at 500°C which converts the inactive aluminum compounds to active alumina. The honeycomb obtained in this manner contains a coating of active alumina with large surface area. The weight of the coating amounts to 7 percent of the weight of the uncoated honeycomb support. The coated honeycomb support is impregnated with 200 ml of aqueous solution of:

7.94 g La(NO$_3$)$_3$ . 6 H$_2$O
2.67 g Co(NO$_3$)$_2$ . 6 H$_2$O
0.93 g Ru as nitrate.

The honeycomb body is then dried at 240°C and subjected to a four-hour heat treatment at 550°C. The coating thus applied to the support corresponds to the composition LaCo$_{1/2}$Ru$_{1/2}$O$_3$ and contains 0.7 g/l of ruthenium.

The coated honeycomb body thus obtained is impregnated with 200 ml of an aqueous solution containing 0.586 g Pt as H$_2$PtCl$_6$ and 0.318 g Pd as PdCl$_2$, dried at 240°C and reduced in a stream of H$_2$/N$_2$(10% N$_2$, 90% N$_2$).

The finished catalyst contains 0.442 g/l of metallic platinum and 0.239 g/l of metallic palladium; this corresponds to an atomic ratio of Pt : Pd of 1 : 1.

Figure 2:
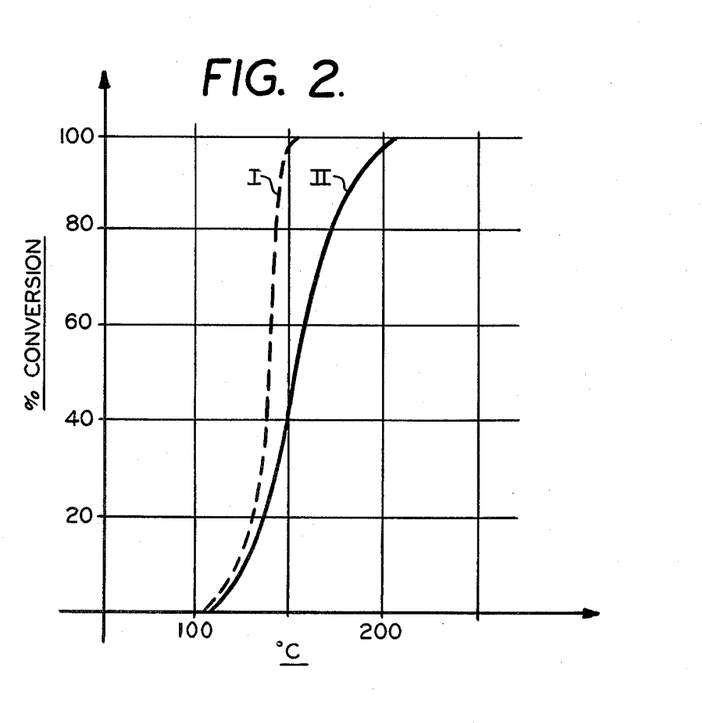

Its effectiveness is tested as described in Example 1, and may be seen represented in Curve I (conversion of CO to CO$_2$, broken line) and Curve II (nitrogen oxide reduction to N$_2$, solid line) in FIG. 2.

The oxidation of the CO begins at about 125°C and becomes complete at about 150°C; the nitrogen oxide reduction begins at about 130°C and becomes complete at about 180°C.

In a second preparation, a coated honeycomb body prepared as described in this example, is impregnated with an aqueous solution containing 2.33 g H$_2$PtCl$_6$, dried at 240°C and reduced in a stream of H$_2$/N$_2$(10% H$_2$, 90% N$_2$) to give a finished catalyst containing 0.7 g/l metallic Pt and exhibiting oxidation and reduction activity.

EXAMPLE 3

A honeycomb support (vol. 1.331) with an alumina coating is prepared as in Example 2 and impregnated as in Example 2 with 200 ml of aqueous solution of:

7.94 g La (NO$_3$)$_3$ . 6 H$_2$O
2.67 g Co (NO$_3$)$_3$ . 6 H$_2$O
0.93 g Ru as nitrate and dried and heat-treated as in Examples 1 and 2. The composition applied to the support corresponds to the general formula LaCo$_{1/2}$Ru$_{1/2}$O$_3$.

The coated honeycomb body thus obtained is impregnated with 200 ml of an aqueous solution of 0.55 g Pt as H$_2$PtCl$_6$
0.298 g Pd as PdCl$_2$
0.058 g Rh as RhCl$_3$.

Drying and reducing are then performed as described in Examples 1 and 2. The finished catalyst contains 0.414 g/l Pt, 0.224 g/l Pd and 0.044 g/l Rh, each metallic form.

Figure 3:
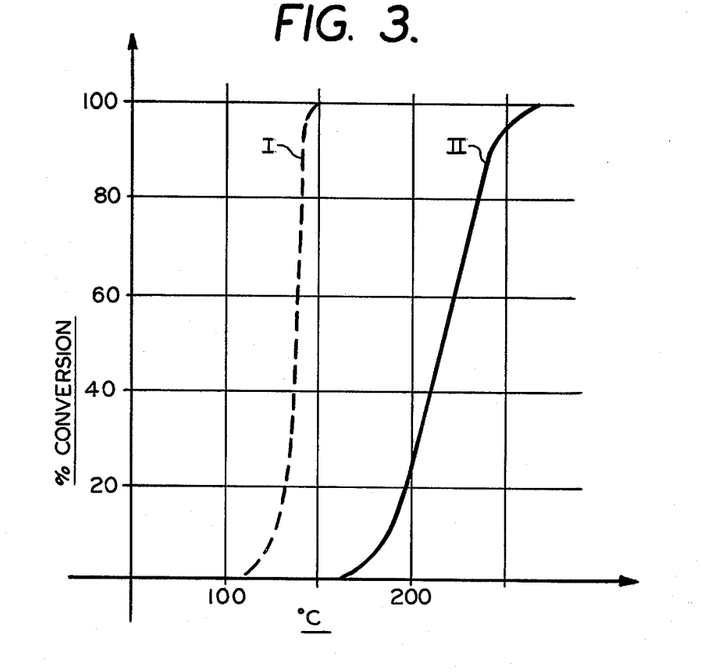

The effectiveness of the catalyst, tested as described in Example 1, is shown by the Curves I (transformation of CO to CO$_2$, broken line) and II (reduction of nitrogen oxide to N$_2$, solid line) in FIG. 3.

The oxidation of CO begins at about 125°C and becomes complete at about 150°C. The nitrogen oxide reduction begins at about 190°C and is complete at about 245°C.

In a second preparation, a coated honeycomb body prepared as described in this example, is impregnated with an aqueous solution containing 2.33 g H$_2$PtCl$_6$, dried at 240°C and reduced in a stream of H$_2$/N$_2$ (10% H$_2$, 90% N$_2$) to give a finished catalyst containing 0.7 g/l metallic Pt and exhibiting oxidation and reduction activity.

EXAMPLE 4

A suspension, which contains 148 g of a boehmite gel (analytically determined aluminum content 36.5%) 83.4 g Al(NO$_3$)$_3$.9H$_2$O and 336.5 g Co(NO$_3$)$_2$.6H$_2$O in 1 l of water, is heated tothe boiling point for one hour. The honeycomb support (vol. 1.33 l) is impregnated with the cooled suspension, blown out with compressed air and dried at 250°C.

After drying, the honeycomb body, which then has a coating amounting to approximately 5 percent of the entire body and containing cobalt and aluminum in a ratio of 0.52 : 1, is heat-treated for 2 hours at 900°C, whereupon the aluminum and cobalt compounds in the surface are completely transformed to cobalt aluminum spinel.

Using the honeycomb body thus prepared, containing cobalt spinel, a coated honeycomb body prepared as described in Example 2 containing the composition $LaCo_{1/2}Ru_{1/2}O_3$ is impregnated as in Example 2 with Pt and Pd in metallic form and the atomic ratio of Pt : Pd in the finished catalyst is 1 : 1.

Figure 4:
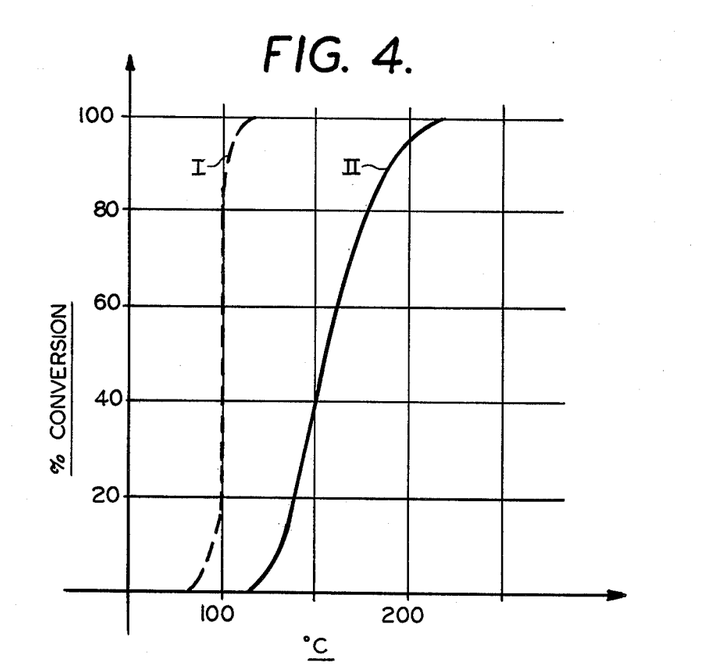

Its activity is tested by the method described in Example 1 and is represented in FIG. 4 by Curves I (conversion CO to $CO_2$, broken line) and II (nitrogen oxide reduction to $N_2$, solid line).

The CO oxidation begins at about 95°C and becomes complete at about 105°C. The nitrogen oxide reduction begins at about 135°C and becomes complete at about 190°C.

In a second preparation, a coated honeycomb body prepared as described in this example, is impregnated with an aqueous solution containing 2.33 g $H_2PtCl_6$, dried at 240°C and reduced in a stream of $H_2/N_2$ (10% $H_2$, 90% $N_2$) to give a finished catalyst containing 0.7 g/l metallic Pt and exhibiting oxidation and reduction activity.

EXAMPLE 5

4.45 g of lanthanum, 1.04 g of copper and 0.881 g of manganese, each in the form of the nitrates, are dissolved in 600 ml of water. A honeycomb body is prepared, coated, dried and treated as in Example 2. The coated body contains 2 percent by weight of composition $$LaCu_{1/2}Mn_{1/2}O_3$$

and is thereafter impregnated with an aqueous solution, containing dried $PdCl_2$ and reduced as in Example 1 resulting in a finished catalyst containing 0.1 percent by wt. Pd which exhibits oxidation and reduction activity.

In a second preparation, a coated honeycomb body, prepared as described in this example, is impregnated with 200 ml of an aqeous solution containing 0.586 g Pt as $H_2Pt Cl_6$ and 0.318 g Pd as $Pd Cl_2$, , dried at 240°C and reduced in a stream of $H_2/N_2$ (10 percent $H_2$, 90 percent $N_2$) to give a finished catalyst containing metallic Pt and metallid Pd in an atomic ratio of 1 to 1 and exhibiting oxidation and reduction activity.

EXAMPLE 6

4.45 g of lanthanum, 0.2985 g of iron, 0.3135 g of nickel, 0.3149 g of cobalt, each used in the form of the nitrates, and 0.766 g of titanum, used as titanum(III)-chloride, are dissolved in 600 ml of water. $H_2O_2$ is used for the oxidation of titanium (III) to titanum(IV). A honeycomb body is prepared, coated, dried and treated as in Example 2. The coated body contains 3 percent by wt. of the composition $$LaFe_{1/6}Ni_{1/6}Co_{1/6}Ti_{1/2}O_3$$

and is thereafter impregnated with an aqueous solution, dried and reduced as in Example 2 resulting in a finished catalyst containing Pt and Pd in an amount of 0.4 percent by wt. (atomic ration Pt to Pd in 2 to 1) which exhibits oxidation and reduction activity.

In a second preparation, a coated honeycomb body prepared as described in this example is impregnated with an aqueous solution containing 2.33 g $H_2PtCl_6$, dried at 240°C and reduced in a stream of $H_2/N_2$ (10% $H_2$, 10% $N_2$) to give a finished catalyst containing 0.7 g/l metallic Pt and exhibiting oxidation and reduction activity.

EXAMPLE 7

4.45 g of lanthanum, 0.3135 g of nickel, 0.3149 g of cobalt, 0.2985 g of iron, 0.529 g of ruthenium, each in the form of nitrates, and 0.511 g of titanium used as titanium (III) in the form of titanium (III)-chloride, are dissolved in 600 ml of water. By the addition of $H_2O_2$ titanium (III) is oxidized to titanium (IV). A honeycomb body is prepared, coated, dried and treated as in Example 2. The coated body contains the composition $$LaFe_{1/6}Ni_{1/6}Co_{1/6}Ru_{1/6}Ti_{1/3}O_3$$

impregnated with an aqueous solution, dried and reduced as in Example 2 resulting in a finished catalyst containing Pt and Pd in an atomic ratio of 1 to 1 which exhibits oxidation and reduction activity.

In a second preparation, a coated honeycomb body prepared as described in this example, is impregnated with an aqueous solution containing 2.33 g $H_2PtCl_6$, dried at 240°C and reduced in a stream of $H_2/N_2$ (10% $H_2$, 90% $N_2$) to give a finished catalyst containing 0.7 g/l metallic Pt and exhibiting oxidation and reduction activity.

EXAMPLE 8

4.45 g of lanthanum, 0.3135 g of nickel, 0.3149 g of cobalt, 0.2985 g of iron and 0.815 g of vanadium, each in the form of nitrates, are dissolved in 600 ml of water. A honeycomb tube body is prepared, coated, dried and treated as in Example 2. The coated body contains the composition $$LaFe_{1/6}Ni_{1/6}Co_{1/6}V_{1/2}O_3$$

and is thereafter impregnated with an aqueous solution, dried and reduced as in Example 2 resulting in a finished catalyst containing Pt and Pd in an atomic ratio of 1 to 1 which exhibits oxidation and reduction activity.

In a second preparation, a coated honeycomb body prepared as described in this example, is impregnated with an aqueous solution containing 2.33 g $H_2PtCl_6$, dried at 240°C and reduced in a stream of $H_2/N_2$ (10% $H_2$, 90% $N_2$) to give a finished catalyst containing 0.7 g/l metallic Pt and exhibiting oxidation and reduction activity.

EXAMPLE 9

1.536 g of molybdenum are dissolved as ammonium molybdate in aqueous ammonia solution. After neutralization with nitric acid, 4.45 g of lanthanum and 0.94 g of nickel in the form of the nitrates dissolved in water are added. A honeycomb body is prepared, coated, dried and treated as in Example 2. The coated body contains the composition $$LaNi_{1/2}Mo_{1/2}O_3$$

and is threafter impregnated with an aqueous solution, dried and reduced as in Example 2 resulting in a finished catalyst containing Pt and Pd in an atomic ratio of 1 to 1 which exhibits oxidation and reduction activity.

In a second preparation, a coated honeycomb body prepared as described in this example, is impregnated with an aqueous solution containing 2.33 g $H_2PtCl_6$, dried at 240°C and reduced in a stream of $H_2/N_2$ (10% $H_2$, 90% $N_2$) to give a finished catalyst containing 0.7 g/l metallic Pt and exhibiting oxidation and reduction activity.

EXAMPLE 10

4.45 g of lanthanum, 2.21 g of barium, 0.94 g of nickel and 1.76 g of manganese, each used in the form of the nitrates, are dissolved in 60 ml of water. A honeycomb body is prepared, coated, dried and treated as in Example 2. The coated body contains the composition $$La_{2/3}Ba_{1/3}Ni_{1/3}Mn_{2/3}O_3$$

and is thereafter impregnated with an aqeous solution, dried and reduced as in Example 2 resulting in a finished catalyst containing Pt and Pd in an atomic ratio of 1 to 1 which exhibits oxidation and reduction activity.

In a second preparation, a coated honeycomb body prepared as described in this example, is impregnated with an aqueous solution containing 2.33 g $H_2PtCl_6$, dried at 240°C and reduced in a stream of $H_2/N_2$ (10% $H_2$, 90% $N_2$) to give a finished catalyst containing 0.7 g/l metallic Pt and exhibiting oxidation and reduction activity.

EXAMPLE 11

Following the procedure of Example 1, a catalyst containing $$Nd_{1/3}Sr_{2/3}MnO_3 \text{ and Pt}$$

is prepared from a solution of 6.61 g of $Nd(NO_3)_3$, 11.35 g of $Sr(NO_3)_2 \cdot 4H_2O$ and 11.88 g of $MnCl_2 \cdot 4H_2O$ in 100 ml of water.

EXAMPLE 12

Following the procedure of Example 2, a catalyst containing $$Nd_{1/2}Sr_{1/2}Mn_{1/4}Nb_{3/4}O_3$$

and Pt and Pd in an atomic ratio of 1 to 1 is prepared from a solut solution of 9.91 g of $Nd(NO_3)_3$, 8.51 g of $Sr(NO_3)_2 \cdot 4H_2O$, 2.97 g of $MnCl_2 \cdot 4H_2O$ and 12.17 g of $NbCl_5$ in 100 ml of water, containing concentrated hydrochloric acid in an amount sufficient to prevent hydrolysis of the $NbCl_5$.

EXAMPLE 13

Following the procedure of Example 3 a catalyst containing $$Nd_{1/4}Sr_{3/4}Mn_{5/12}Nb_{1/12}O_3$$

and Pt, Pd and Rh is prepared from a solution of 4.45 g of $Nd(NO_3)_3$, 12.77 g of $Sr(NO_3)_2 \cdot 4H_2O$, 4.95 g of $MnCl_2 \cdot 4H_2O$ and 9.46 g of $NbCl_5$ in 100 ml of water, containing concentrated hydrochloric acid in an amount sufficient to prevent hydrolysis of the $NbCl_5$.

EXAMPLE 14

Following the procedure of Example 1 a catalyst containing $$Nd_{1/3}Pb_{2/3}MnO_3 \text{ and Pt}$$

is prepared from a solution of 6.61 g of $Nd(NO_3)_3$, 15.19 g of $Pb(NO_3)_2$, 11.88 g of $MnCl_2 \cdot 4H_2O$ and 4 g of tartaric acid in 100 ml of water.

EXAMPLE 15

Following the procedure of Example 2 a catalyst containing $$Nd_{1/2}Pb_{1/2}Mn_{1/4}Nb_{3/4}O_3 \text{ and Pt and Pd}$$

is prepared from a solution of 9.91 g of $Nd(NO_3)_3$, 9.24 g of $Pb(NO_3)_2$, 2.97 g of $MnCl_2 \cdot 4H_2O$, 12.17 g of $NbCl_5$ and 3 g of tartaric acid in 100 ml of water, containing concentrated hydrochloric acid in an amount sufficient to provide hydrolysis of the $NbCl_5$.

EXAMPLE 16

Following the procedure of Example 1 a catalyst containing $$Nd_{1/4}Pb_{3/4}Mn_{5/12}Nb_{7/12}O_3 \text{ and Pt}$$

can be prepared from a solution of 4.45 g of $Nd(NO_3)_3$, 17.08 g of $Pb(NO_3)_2$, 4.95 g of $MnCl_2 \cdot 4H_2O$, 9.46 g of $NbCl_5$ and 4.5 g of tartaric acid in 100 ml of water containing concentrated hydrochloric acid in an amount sufficient to prevent hydrolysis of the $NbCl_5$.

EXAMPLE 17

Following the procedure of Example 1 a catalyst containing $Nd_{1/3}Ba_{2/3}Mn_{1/6}Nb_{5/6}O_3$ and Pt is prepared from 3.36 g of $Nd_2O_3$, 6.90 g of $Ba(CO_3)_2$ and 1.15 g of $Mn(CO_3)_2$, dissolved in a solution of 10 ml of concentrated nitric acid in 90 ml of water. The obtained solution is mixed with a solution of 6.65 g of $Nb_2O_5$ in 100 ml of an aqueous solution containing 10 percent of weight of tartaric acid.

EXAMPLE 18

Following the procedure of Example 2 a catalyst containing $Nd_{1/2}Ba_{1/2}MnO_3$ and Pt and Pd is prepared from 5.14 g of $Nd_3O_3$, 5.921 g of $Ba(CO_3)_2$ and 6.90 g of $Mn(CO_3)_2$ suspended in 100 ml of water and dissolved by adding concentrated nitric acid.

EXAMPLE 19

Following the procedure of Example 1 a catalyst containing $Nd_{1/4}Ba_{3/4}Mn_{5/12}Nb_{7/12}O_3$ and Pt is prepared from 2.52 g of $Nd_2O_3$, 8.88 g of $Ba(CO_3)_2$ and 2.87 g of $Mn(CO_3)_2$, dissolved in a solution of 10 ml of concentrated nitric acid in 90 ml of water. The obtained solution is mixed with a solution of 4.65 g of $Nb_2O_5$ in 100 ml of an aqueous solution containing 10 percent by weight of tartaric acid.

EXAMPLE 20

Following the procedure of Example 1, a catalyst containing $Nd_{5/6}Ba_{1/6}Co_{5/12}V_{7/12}O_3$ and Pt is prepared by admixing a solution of 16.52 g of $Nd(NO_3)_3$, 2.61 g of $Ba(NO_3)_2$ and 7.28 g of $Co(NO_3)_2 \cdot 6H_2O$ in 50 ml of water with a solution of 6.36 g of $V_2O_5$ in 50 ml of a dilute solution of ammonium hydroxide thereby providing a precipitate, suspended in the solution medium.

The element or element mixture present in metallic form covers a portion of the surface of the catalyst support and/or a portion of the surface of the composition.

Figure 5:
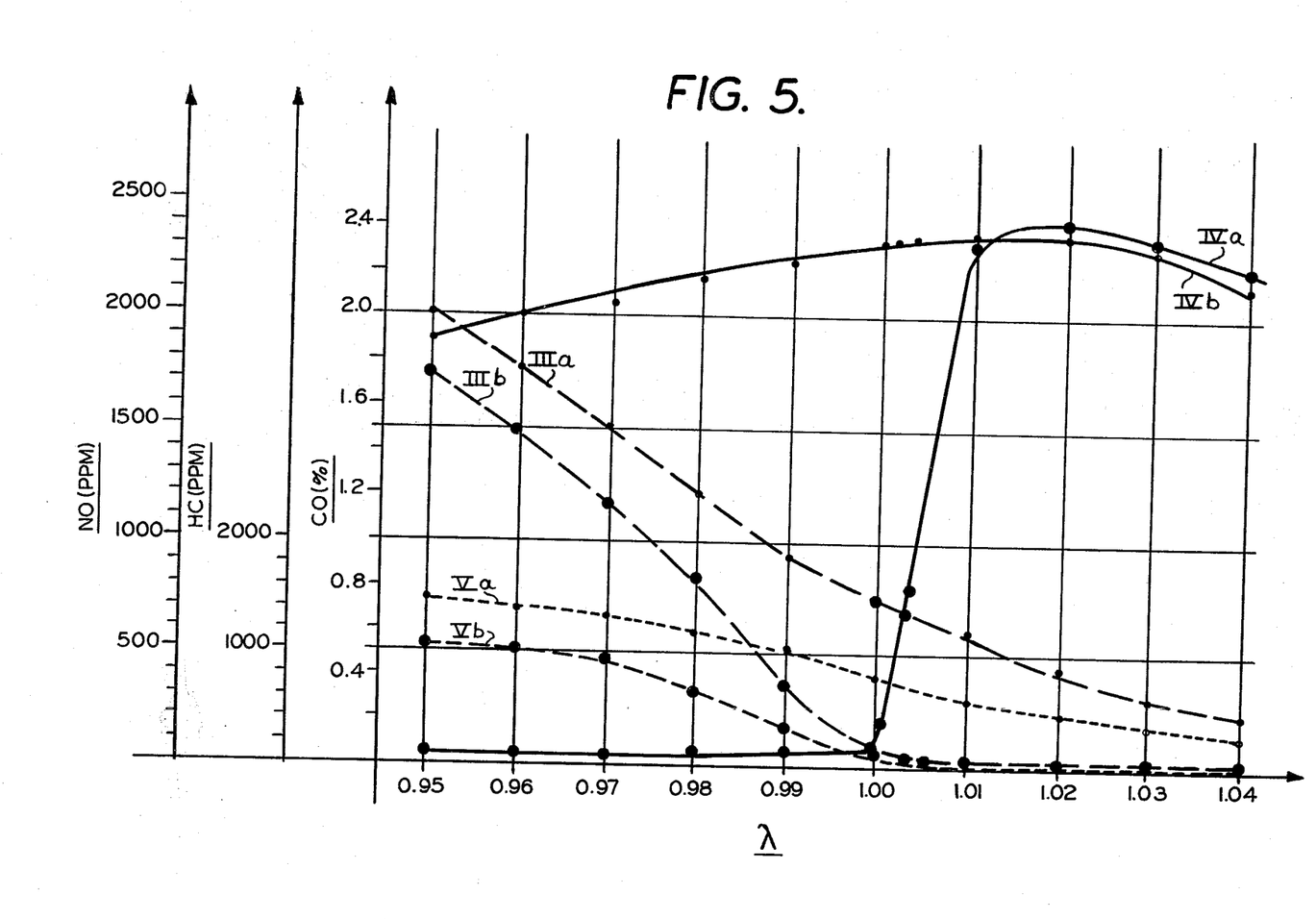
FIG. 5 is a graph showing the results of an engine test run with the catalyst of the invention.

FIG. 5 represents the results of an engine test in which an Otto cycle engine was used, and a catalyst prepared in accordance with Example 4 was used for the purification of the exhaust. The concentration of NO and hydrocarbons (abbreviated HC), stated in ppm, was measured prior to the entrance of the exhaust gas into the catalyst-filled reactor, and the concentration of CO, stated in percent, was measured after the emergence of the gas therefrom. The results of these measurements are plotted in FIG. 5 in relation to the air-to-fuel ratio λ.

Curves IIIa, IVa and Va show the concentrations of CO, NO and HC, respectively, prior to entrance into the reactor, and curves IIIb, IVb and Vb, respectively, represent the concentration of CO, NO and HC after the exhaust gas leaves the reactor.

In the single-bed process, i.e., where $\lambda = 1$, the following transformations were obtained:

| | | |
|---|---|---|
| CO | → CO$_2$ | 84% |
| NO | → N$_2$ | 96.5% and |
| HC | → CO$_2$ + H$_2$O | 91.5% |

In the two-bed process, where $\lambda = 0.95$, for example, the transformation of NO in the 1st catalyst bed is 97.5 percent. After the addition of secondary air and hence the modification of the value of $\lambda$ to more than 1, e.g., $\lambda = 1.03$, a transformation is obtained in the 2nd catalyst bed of more than 98 percent for CO and more than 99 percent for HC.

What is claimed is:

1. Catalyst for purifying exhaust gases containing nitrogen oxides, carbon monoxide or hydrocarbons, said catalyst comprising a support containing:
   a. a composition having the formula $$(A_1)_m(A_2)_n(B_1)_p(B_2)_q O_3$$

wherein
   $m$ and $n$, respectively, have values of 0 to 1, and $p$ and $q$, respectively have values greater than 0 but less than 1, and
   $m + n + 1$ and $p + q + 1$; and
   $A_1$ is at least one trivalent cation of metals selected from the the group consisting of the rare earth metals;
   $A_2$ is at least one divalent cation of metals selected from the group consisting of Sr, Ba and Pb;
   $B_1$ is at least one divalent cation of metals selected from the group consisting of Ni, Co, Fe, Cu and Mn;
   $B_2$ is at least one tetravalent cation of metals selected from the group of Ru, Os, Ir, Pt, Ti, Mo, Nb, Mn and V; with the proviso that when $B_1$ is Cu, $n$ is 0 and $B_2$ is only Mn, when n is greater than 0, $B_1$ is selected from the group consisting of Ni, Co, Fe and Mn and $B_2$ is selected from the group consisting of Mn, Nb and V, with the further proviso that $(m \cdot a_1) + (n \cdot a_2) + (p \cdot b_1) + (q \cdot b_2)$ equals 6 such that a neutrality of charge exists, wherein $a_1$ equals the valency of $A_1$, $a_2$ equals the valency of $A_2$, $b_1$ equals the valency of $B_1$ and $b_2$ equals the valency of $B_2$; and
   b. at least one element in metallic form selected from the group consisting of ruthenium, rhodium, palladium, iridium and platinum.

2. Catalyst of claim 1 wherein component (b) is platinum.

3. Catalyst of claim 1 wherein component (b) is a mixture of platinum and palladium.

4. Catalyst of claim 3 wherein platinum and palladium are present in an atomic ratio of 1 : 4 to 4 : 1.

5. Catalyst of claim 4 wherein platinum and palladium are present in the atomic ratio of 1 : 1.

6. Catalyst of claim 1 wherein component (a) is selected from the group consisting of compositions having the formulae:
   LaCo$_{1/6}$Fe$_{1/6}$Ni$_{1/6}$Ru$_{1/2}$O$_3$,
   LaCo$_{1/2}$Ru$_{1/2}$O$_3$,
   LaCu$_{1/2}$Mn$_{1/2}$O$_3$,
   LaFe$_{1/6}$No$_{1/6}$Co$_{1/6}$Ti$_{1/2}$O$_3$,
   LaFe$_{1/6}$Ni$_{1/6}$Co$_{1/6}$Ru$_{1/6}$Ti$_{1/3}$O$_3$,
   LaFe$_{1/6}$Ni$_{1/6}$Co$_{1/6}$V$_{1/2}$O$_3$,
   LaNi$_{1/2}$Mo$_{1/2}$O$_3$, and
   La$_{2/3}$Ba$_{1/3}$Ni$_{1/3}$Mn$_{2/3}$O$_3$.

7. Catalyst of claim 1 wherein the support is made of ceramic material.

8. Catalyst of claim 1 wherein the support is in honeycomb tube form.

9. Catalyst of claim 1 wherein the support comprises cobalt aluminum spinel.

10. Catalyst of claim 1 wherein component (b) present in metallic form covers a portion of the surface of the support.

11. Catalyst of claim 1 wherein component (b) in metallic form covers a portion of the surface of component (a).

* * * * *

UNITED STATES PATENT OFFICE
CERTIFICATE OF CORRECTION

PATENT NO. : 3,905,918
DATED : September 16, 1975
INVENTOR(S) : Gerhard Mai et al It is certified that error appears in the above-identified patent and that said Letters Patent are hereby corrected as shown below:

Column 1, line 22 — In the general formula change "(2)" to --$(B_2)$--.

Column 6, line 35 — Before "each metallic form." insert --in--.

Column 9, line 46 — "$Nd_{1/4}Sr_{3/4}Mn_{5/12}Nb_{1/12}O_3$"

should read

--$Nd_{1/4}Sr_{3/4}Mn_{5/12}Nb_{7/12}O_3$--.

Column 12, line 22 — "$LaFe_{1/6}No_{1/6}Co_{1/6}Ti_{1/2}O_3$"

should read

--$LaFe_{1/6}Ni_{1/6}Co_{1/6}Ti_{1/2}O_3$--.

Signed and Sealed this

Sixth Day of July 1976

[SEAL]

Attest:

RUTH C. MASON
*Attesting Officer*

C. MARSHALL DANN
*Commissioner of Patents and Trademarks*